(12) United States Patent
Haruta

(10) Patent No.: US 11,608,204 B2
(45) Date of Patent: Mar. 21, 2023

(54) HEAT-SHRINKABLE FILM, HEAT SHRINK LABEL, AND PACKAGE

(71) Applicant: TOYOBO CO., LTD., Osaka (JP)

(72) Inventor: Masayuki Haruta, Tsuruga (JP)

(73) Assignee: TOYOBO CO., LTD., Osaka (JP)

( * ) Notice: Subject to any disclaimer, the term of this patent is extended or adjusted under 35 U.S.C. 154(b) by 1093 days.

(21) Appl. No.: 16/320,477

(22) PCT Filed: Jul. 24, 2017

(86) PCT No.: PCT/JP2017/026609
§ 371 (c)(1),
(2) Date: Jan. 24, 2019

(87) PCT Pub. No.: WO2018/021212
PCT Pub. Date: Feb. 1, 2018

(65) Prior Publication Data
US 2021/0016913 A1   Jan. 21, 2021

(30) Foreign Application Priority Data

Jul. 27, 2016   (JP) .............................. JP2016-147257

(51) Int. Cl.
| | | |
|---|---|---|
| B65C 5/04 | (2006.01) | |
| B65D 1/04 | (2006.01) | |
| B65D 75/00 | (2006.01) | |
| C08L 67/02 | (2006.01) | |
| C08L 23/08 | (2006.01) | |

(52) U.S. Cl.
CPC .............. B65C 5/04 (2013.01); B65D 1/04 (2013.01); C08L 23/0823 (2013.01); *B65D 75/002* (2013.01); *C08L 67/02* (2013.01); *C08L 2203/16* (2013.01); *Y10T 428/1331* (2015.01)

(58) Field of Classification Search
CPC ... B65D 75/002; B65D 71/05; C08L 2205/02; C08L 2205/025; C08L 2203/16; C08L 67/02; C08L 67/03; B32B 27/36; C08K 2367/02; Y10S 428/91; B29C 61/003; B29C 61/06; B29C 55/04
See application file for complete search history.

(56) References Cited

U.S. PATENT DOCUMENTS

| | | | | |
|---|---|---|---|---|
| 4,814,426 | A * | 3/1989 | Utsumi ................. | B29C 61/003 528/308.1 |
| 7,572,865 | B2 * | 8/2009 | Itoh ......................... | C08J 5/18 428/35.8 |
| 2010/0256309 | A1 * | 10/2010 | Endo ....................... | C08J 5/18 525/384 |
| 2013/0034673 | A1 * | 2/2013 | Haruta ................. | B29C 55/143 264/237 |
| 2013/0150532 | A1 * | 6/2013 | Jheng ................... | C08G 63/199 264/210.1 |

FOREIGN PATENT DOCUMENTS

| | | | |
|---|---|---|---|
| JP | H09-272150 A | | 10/1997 |
| JP | 2001200076 A | * | 7/2001 |
| JP | 2003-025438 A | | 1/2003 |
| JP | 5408250 B2 | | 2/2014 |
| WO | WO 2017/022742 A1 | | 2/2017 |

OTHER PUBLICATIONS

Japanese Patent Office, International Search Report in International Application No. PCT/JP2017/026609 (dated Oct. 17, 2017).

* cited by examiner

*Primary Examiner* — Lee E Sanderson
(74) *Attorney, Agent, or Firm* — Leydig, Voit & Mayer, Ltd.

(57) ABSTRACT

The invention provides a heat-shrinkable film that has (1) a glass transition temperature (Tg) of 90-140° C.; (2) shrinkage of 12% or less in a main shrinkage direction when treated in glycerin at 80° C. for 10 seconds; (3) shrinkage of 12% or less in a direction orthogonal to the main shrinkage direction when treated in glycerin at 140° C. for 10 seconds; (4) shrinkage of 30%-80% in the main shrinkage direction when treated in glycerin at 140° C. for 10 seconds; (5) a tensile elongation at break of 10% or more both in the main shrinkage direction and the orthogonal direction after aging of 672 hours at 50° C. and 70% RH; and (6) a difference of 5% or less between shrinkage at 140° C. in the main shrinkage direction after aging of 672 hours at 50° C. and 70% RH, and shrinkage at 140° C. in the main shrinkage direction before the aging.

19 Claims, No Drawings

HEAT-SHRINKABLE FILM, HEAT SHRINK LABEL, AND PACKAGE

CROSS-REFERENCE TO RELATED APPLICATIONS

This patent application is the U.S. national phase of International Patent Application No. PCT/JP2017/026609, filed Jul. 24, 2017, which claims the benefit of Japanese Patent Application No. 2016-147257, filed on Jul. 27, 2016, which are incorporated by reference in their entireties herein.

TECHNICAL FIELD

The present invention relates to a heat-shrinkable film, a heat-shrinkable label, and a package, and specifically relates to a heat-shrinkable film suitable to a label application, a label including the heat-shrinkable film, and a package including the label.

BACKGROUND ART

Recently, in applications such as label package doubling as a protection of a glass bottle and a PET bottle etc. and display of articles, cap sealing and accumulation package, there have been widely used stretched films (so-called heat-shrinkable films) composed of a polyvinyl chloride resin, a polystyrene resin, a polyethylene resin or the like. In particular, the use amount of heat-shrinkable films tends to increase being accompanied by an increase in distribution amount volume of PET bottle containers for beverages By utilizing the characteristic of being heat-shrinkable, a heat-shrinkable film has been used also in applications other than labels of PET bottle containers. For example, it is used in a covering of a wire-connecting portion of a motor. However, in some motors, temperature rises to about 50° C. in operation time. Therefore, a heat-shrinkable film to be used is also required to have a heat resistance for a use at around 60° C.

However, a heat-shrinkable film has problems such that, when the temperature is high such as summer season, if the film is stored in an outside storehouse where temperature is not controlled, the film become weak, or lowers its shrinkage. Therefore, a heat-shrinkable film is generally stored under a low-temperature condition of a temperature of 25° C. or lower. Thus, use, in a high-temperature location, of a heat-shrinkable film which is generally inferior in weatherability causes problems such as an occurrence of a case that the film is weakened, and tear and come off due to a vibration or the like. These are caused because, one direction shrink films, which are general heat-shrinkable films, are formed by monoaxial stretching, and therefore, the non-shrinkage direction (the direction orthogonal to the direction of main shrinkage) thereof is unstretched in film production process, to have molecules unoriented, and accordingly, such films are easily torn in the non-shrinkage direction by aging at a high temperature.

It is also considered to be the cause that, due to a low glass transition temperature of the films, polymers are deteriorated by an influence of heat, and the films have become easy to be torn.

PRIOR ART DOCUMENT

Patent Documents

Patent Document 1: JP-5408250-B

SUMMARY OF THE INVENTION

Problems to be Solved by the Invention

The present invention is to solve the problems of conventional heat-shrinkable film, and to provide a heat-shrinkable film which is hard to be torn (hard to be broken), even if the film is stored or used in a high-temperature location.

As mentioned in the Patent Document 1, a heat-shrinkable polyester film capable of obtaining a desirable elongation at break when subjected to an aging at a high temperature has also been reported in the past. However, a method thereof is a method in which a mechanical strength in the non-shrinkage direction is increased by a biaxial stretching. Commonly used as heat-shrinkable films are monoaxially stretched films stretched only in the main shrinkage direction. Therefore, a production method by biaxial stretching as shown in the Patent Document 1 has a disadvantage of having a high cost of production facility, and a large sized production facility.

In addition, a film only monoaxially stretched has a high shrinkage in the main shrinkage direction, as compared with a biaxial stretched film, at a same amorphous amount of raw material, and therefore a film only monoaxially stretched is suitable to a high shrinkage application.

Then, the present inventors keenly studied to solve the problems, and as a result, have newly found a monoaxially stretched heat-shrinkable film which is resistaant to storage or use under a high temperature, and finally completed the present invention. That is, the present invention is configured as follows.

Means for Solving the Problems

1. A heat-shrinkable film which satisfies requirements (1) to (6) below:

(1) the heat-shrinkable film has a glass transition temperature (Tg) of 90° C. or higher and 140° C. or lower;

(2) the heat-shrinkable film has a shrinkage of 12% or less in a main shrinkage direction of the heat-shrinkable film when treated in glycerin at 80° C. for 10 seconds;

(3) the heat-shrinkable film has a shrinkage of 12% or less in a direction orthogonal to the main shrinkage direction of the heat-shrinkable film when treated in glycerin at 140° C. for 10 seconds;

(4) the heat-shrinkable film has a shrinkage of 30% or more and 80% or less in the main shrinkage direction of the heat-shrinkable film when treated in glycerin at 140° C. for 10 seconds;

(5) the heat-shrinkable film has a tensile elongation at break of 10% or more both in the main shrinkage direction and in the direction orthogonal to the main shrinkage direction of the heat-shrinkable film after an aging of 672 hours under an atmosphere of a temperature of 50° C. and a relative humidity of 70%; and (6) the heat-shrinkable film has a difference of 5% or less between a shrinkage at 140° C. in the main shrinkage direction of the heat-shrinkable film after the aging of 672 hours under an atmosphere of a temperature of 50° C. and a relative humidity of 70%, and a shrinkage at 140° C. in the main shrinkage direction of the heat-shrinkable film before the aging.

2. The heat-shrinkable film according to above 1, wherein a ratio of a tensile strength at break in the main shrinkage direction of the heat-shrinkable film and in the direction orthogonal to the main shrinkage direction (a tensile strength at break in the main shrinkage direction of the film÷a tensile strength at break in the direction orthogonal to the main shrinkage direction of the film) is 0.1 or more and 0.5 or less.

3. The heat-shrinkable film according to above 1 or 2, wherein a ratio of a tear propagation strength in the main shrinkage direction of the heat-shrinkable film and in the direction orthogonal to the main shrinkage direction (a tear propagation strength in the main shrinkage direction of the film÷a tear propagation strength in the direction orthogonal to the main shrinkage direction of the film) is 0.1 or more and 0.5 or less.

4. The heat-shrinkable film according to any of above 1 to 3, which has a shrinkage of 1.5% or less in the main shrinkage direction of the heat-shrinkable film after the aging of 672 hours under an atmosphere of a temperature of 50° C. and a relative humidity of 70%.

5. The heat-shrinkable film according to any of above 1 to 4, which is a monoaxially stretched film.

6. A heat-shrinkable label including the heat-shrinkable film according to any of above 1 to 5.

7. A package formed by covering at least apart of an outer periphery of an object to be packaged with the heat-shrinkable label according to above 6.

Effects of the Invention

The heat-shrinkable film of the present invention which is stretched in monoaxial direction is a film only monoaxially stretched, having a high glass transition temperature, and has little change in film physical properties after subjected to an aging treatment of 672 hours under an environment of temperature of 50° C. and relative humidity of 70%. Therefore, film deterioration when used in a high temperature location is small, and package breakage is infrequent. In addition, for being a monoaxially stretched film, it is possible to down-size a scale of machine for production.

MODE FOR CARRYING OUT THE INVENTION

The heat-shrinkable film of the present invention is a heat-shrinkable film satisfying requirements (1) to (6) below:

(1) the heat-shrinkable film has a glass transition temperature (Tg) of 90° C. or higher and 140° C. or lower;

(2) the heat-shrinkable film has a shrinkage of 12% or less in a main shrinkage direction of the heat-shrinkable film when treated in glycerin at 80° C. for 10 seconds;

(3) the heat-shrinkable film has a shrinkage of 12% or less in a direction orthogonal to the main shrinkage direction of the heat-shrinkable film when treated in glycerin at 140° C. for 10 seconds;

(4) the heat-shrinkable film has a shrinkage of 30% or more and 80% or less in the main shrinkage direction of the heat-shrinkable film when treated in glycerin at 140° C. for 10 seconds;

(5) the heat-shrinkable film has a tensile elongation at break of 10% or more both in the main shrinkage direction and in the direction orthogonal to the main shrinkage direction of the heat-shrinkable film after an aging of 672 hours under an atmosphere of a temperature of 50° C. and a relative humidity of 70%; and (6) the heat-shrinkable film has a difference of 5% or less between a shrinkage at 140° C. in the main shrinkage direction of the heat-shrinkable film after the aging of 672 hours under an atmosphere of a temperature of 50° C. and a relative humidity of 70%, and a shrinkage at 140° C. in the main shrinkage direction of the heat-shrinkable film before the aging.

It is also desirable that the heat-shrinkable film of the present invention has a glass transition temperature (Tg) of 90° C. or higher and 140° C. or lower. Tg of lower than 90° C. is not preferred, because when an aging is conducted at 50° C., a difference between an aging temperature and Tg becomes small, and deterioration by an aging easily occurs. A small difference between the aging temperature and Tg is not preferred, because an enthalpy relaxation is increased, difference in shrinkage is increased between before and after an aging, elasticity of a film after aging is lowered to decrease a degradation resistivity. Tg is preferably 93° C. or higher, and more preferably 95° C. or higher.

Further, Tg higher than 140° C. is not preferred, because a heat shrinkage by a heating at 140° C. is decreased. Tg is preferably 135° C. or lower, and more preferably 130° C. or lower.

In addition, when the heat-shrinkable polyester film of the present invention is treated for 10 seconds under no-load condition in glycerin which has been heated to 80° C., it is necessary that a heat shrinkage of the film (namely, 80° C. glycerin heat shrinkage) calculated from lengths before and after the shrink by the following Equation 1 be such that a shrinkage in the main shrinkage direction of the film is 12% or less.

Heat shrinkage={(Length before shrinkage−Length after shrinkage)/Length before shrinkage}×100 (%) (Equation 1)

A 80° C. glycerin shrinkage of higher than 12% in the main shrinkage direction is not preferred, because when an aging is conducted at temperature of 50° C., a difference between an aging temperature and a temperature with high shrinkage rate becomes small, to result an increased natural shrinkage at 50° C. Shrinkage in the 80° C. glycerin is preferably 10% or less, and more preferably 8% or less.

In addition, it is necessary that when the heat-shrinkable polyester film of the present invention is treated for 10 seconds under no-load condition in glycerin which has been heated to 140° C., a heat shrinkage in the direction orthogonal to the main shrinkage direction of the film calculated from lengths before and after the shrink by the above Equation 1 (namely, glycerin heat shrinkage at 140° C.) be 12% or less.

A glycerin heat shrinkage exceeding 12% at 140° C. in the direction orthogonal to the main shrinkage direction is not preferred, because when the film is used as a label, a strain in shrinkage easily occurs at the time of heat shrinkage. An upper limit value of the glycerin heat shrinkage at 140° C. in the direction orthogonal to the main shrinkage direction is preferably 10% or less, and more preferably 8% or less.

In addition, it is necessary that when the heat-shrinkable polyester film of the present invention is treated for 10 seconds under no-load condition in glycerin which has been heated to 140° C., a heat shrinkage in the main shrinkage direction calculated from lengths before and after the shrink by the Equation 1 (namely, glycerin heat shrinkage at 140° C.) be 30% or more and 80% or less, preferably 33% or more and 77% or less, and more preferably 36% or more and 74% or less.

A glycerin heat shrinkage at 140° C. in the main shrinkage direction of less than 30% is not preferred, because the small shrinkage amount causes a wrinkle or a sag on a label after the heat shrinkage. Conversely, a glycerin heat shrinkage at 140° C. in the width direction of more than 70% is not preferred, because when the film is used as a label, a strain in shrinkage easily occurs at the time of heat shrinkage, or a so-called "jumping up" may occur.

In addition, the heat-shrinkable film of the present invention has a tensile elongation at break of 10% or more both in the main shrinkage direction and in the direction orthogonal to the main shrinkage direction, after aging of 672 hours under an atmosphere of temperature 50° C. and a relative humidity of 70%, when measured by the following method.
[Measuring Method of Tensile Elongation at Break]

A tensile test was carried out in conformity with JIS-K7113, by making a rectangular specimen with a predetermined size, holding both ends of the specimen with a universal tensile tester, under a condition of tensile speed 200 mm/min., to measure an extent of elongation to a time of breakage.

A tensile elongation at break of less than 10% is not preferred for easy occurrence of troubles such that a film tears in a process where a tension is applied in a longitudinal direction, such as printing, and for easy occurrence of troubles such that a film is destroyed by a vibration or the like, when the film is used after heat-shrunk at a high temperature. A tensile elongation at break both in the main shrinkage direction and in the direction orthogonal to the main shrinkage direction after an aging of 672 hours under an atmosphere of a temperature of 50° C. and a relative humidity of 70% is preferably 20% or more, and more preferably 30% or more.

Further, the heat-shrinkable film of the present invention has 5% or less difference in glycerin shrinkage at 140° C., between before and after an aging of 672 hours at a temperature of 50° C. and relative humidity of 70%.
[Method for Measuring Difference in Heat Shrinkage Before and after Aging]

Using the above Equation 1, the heat shrinkage of a film in the film main shrinkage direction before and after aging in glycerin at 140° C. was measured. It was calculated using the following Equation 2.

$$\text{Difference in heat shrinkage before and after aging} = \text{Heat shrinkage before aging} - \text{Heat shrinkage after aging} \quad \text{(Equation 2)}$$

A heat shrinkage difference of more than 5% in the main shrinkage direction, between before and after an aging is not preferred, because due to a large difference in shrinkage between a film directly after a production and a film after a storage, a temperature condition for heat shrinkage when used as a label or the like varies, deteriorating a finish quality after shrinkage. An upper limit value of the heat shrinkage difference between before and after an aging in the width direction is preferably 4% or less, and more preferably 3% or less. A lower limit value is preferably 0%.

In addition, it is preferred that a shrinkage in the main shrinkage direction of the film of the heat-shrinkable film of the present invention, after an aging of 672 hours at a temperature of 50° C. and a relative humidity of 70% (so-called natural shrinkage), be 1.5% or less, when obtained by the following method.
[Method for Measurement of Natural Shrinkage]

A film is sampled in a length of 20 mm in the film non-shrinkage direction and 240 mm in the film main shrinkage direction, and marked with lines such that the length in the film main shrinkage direction is 200 mm. The length between the lines is designated as a length (mm) before aging. The film is aged for 672 hours in a geer oven set at a temperature of 50° C. and a relative humidity of 70%, followed by determining the natural shrinkage from the following Equation 3 with the length between the lines designated as a length (mm) after aging.

$$\text{Natural shrinkage} = \{\text{Length before aging} - \text{Length after aging}\}/\text{Length before aging}\} \times 100\% \quad \text{(Equation 3)}$$

A natural shrinkage in the main shrinkage direction of more than 1.5% is not preferred because, in a case where the main shrinkage direction is the width direction, a width of a film product after a storage changes from a width directly after the production, resulting a change of dimension in a working process such as printing. It is not preferred either in a case where the main shrinkage direction is the longitudinal direction, because shrinkage occurs in the rolling direction, causing a wrinkle or a tight winding. An upper limit value of the natural shrinkage is preferably 1.3% or less, and more preferably 1.1% or less. A lower limit value of the natural shrinkage is preferably 0%. However, in view of the raw materials or the production methods, the limit is considered to be 0.05%.

In the heat-shrinkable film of the present invention, a ratio of tensile elongation at break obtained by the following Equation 4 is preferably 0.1 or more and 0.5 or less.

$$\text{Ratio of tensile elongation at break} = \text{Tensile elongation at break in main shrinkage direction} \div \text{Tensile elongation at break in direction orthogonal to main shrinkage direction} \quad \text{(Equation 4)}$$

Ratio of the tensile elongation at break of less than 0.1 is not preferred, because it means that a film is hard to be elongated in the main shrinkage direction, which results an easy occurrence of a trouble such that the film is easily destroyed due to a vibration, or the like. The ratio of higher than 0.5 is not preferred, because a tensile elongation at break in a main shrinkage direction becomes high (a tensile elongation at break in a non-shrinkage direction becomes low), and as a result, when a film is to be cut in the main shrinkage direction, the cut does not run in the main shrinkage direction, but in the non-shrinkage direction. The ratio of tensile elongation at break is preferably 0.15 or more and 0.45 or less.

In the heat-shrinkable film of the present invention, a ratio of tear propagation strength obtained by the following Equation 5 is preferably 0.1 or more and 0.5 or less.
[Measuring Method of Tear Propagation Strength]

The measuring was conducted by Elmendorf method in conformity with JIS-K7128.

$$\text{Ratio of tear propagation strength} = \text{Tear propagation strength in main shrinkage direction} \div \text{Tear propagation strength in direction orthogonal to main shrinkage direction} \quad \text{(Equation 5)}$$

A ratio of tear propagation strength of less than 0.1 is not preferred because it means that a film is hard to be elongated in the main shrinkage direction, which results an easy occurrence of a trouble such that the film is easily destroyed due to a vibration, or the like. The ratio higher than 0.5 is not preferred, because a tear propagation strength in a main shrinkage direction becomes high (a tear propagation strength in a direction orthogonal to a main shrinkage direction becomes low), and as a result, when a film is to be cut in the main shrinkage direction, the cut does not run in the main shrinkage direction, but in the direction orthogonal to the main shrinkage direction, lowering a cut quality after the film is formed into a label as will be described later and covers an object to be packaged. The ratio of tear propagation strength is more preferably 0.15 or more and 0.45 or less.

The thickness of the heat-shrinkable polyester film of the present invention is not particularly limited, but 5 μm or more and 80 μm or less is preferable, and 10 μm or more and 70 μm or less is more preferable.

Hereinbelow, a preferred production method is described with referring to a heat-shrinkable polyester film as an example, among heat-shrinkable films of the present invention. It is possible to obtain an unstretched film by melt-extruding a polyester containing a dicarboxylic acid component and a polyhydric glycol component from an extruder, and then cooling the extruded object on a conductive chill roll (such as a casting roll) so as to be formed into a film.

Incidentally, the melt extrusion is conducted either by extruding a copolyester alone, or by mixing two or more polyesters (copolyester, homopolyester, etc.) and extruding the mixture, in order to impart a necessary heat shrinking characteristic to the film. That is, the film contains a base unit (a crystalline unit such as polyethylene terephthalate and polyethylene naphthalate) and a second alcohol component giving a film an amorphous characteristic differently from the polyhydric glycol component constituting the base unit (such as ethylene glycol component). Main acid component constituting the base unit is preferably terephthalic acid and/or 2,6-naphthalenedicarboxylic acid, and main diol component is preferably ethylene glycol.

Incidentally, when two or more kinds of polyesters are mixed and used, a content of acid components and diol components in a polyester constituting a heat-shrinkable polyester film of the present invention is a content relative to acid components and diol components of the entire polyesters. It is regardless of whether or not an interesterification follows the mixing.

Any of the polyesters may be produced through a polymerization by a conventional method. The polyesters may be obtained by using a direct esterification method in which a dicarboxylic acid and a diol are directly reacted with each other, or an interesterification method in which a dicarboxylic acid dimethyl ester and a diol are reacted with each other. The polymerization may be performed by either a batch method or a continuous method.

When a polyester film containing a second alcohol component other than ethylene glycol is stretched, it is possible to easily obtain the heat-shrinkable polyester film.

As the second alcohol component which imparts amorphous characteristic, it is possible to use a diol component or a trihydric or higher polyhydric alcohol component. Examples of the diol component include alkylene glycols such as 1,3-propanediol, 1,4-butanediol, neopentyl glycol, 2,2-diethyl-1,3-propanediol, 1,6-hexanediol, 3-methyl-1,5-pentanediol, 2-methyl-1,5-pentanediol, 1,9-nonanediol, 1,10-decanediol; cyclic alcohols such as 1,4-cyclohexane dimethanol; ether glycols such as diethylene glycol, triethylene glycol, polypropylene glycol, polyoxytetramethylene glycol, bisphenol compounds or alkylene oxide adducts of derivatives thereof; and dimer diols. Examples of the trihydric or higher alcohol include trimethylolpropane, glycerin, pentaerythritol, etc. Incidentally, as for spiroglycol, norbornane dimethanol, perhydro dimethanonaphthalene diol, perhydro trimethanol anthracene dimethanol, or the like, theses alcohol components are not preferred to be used, since monomers become high cost.

A sum of one or more monomer components which can be an amorphous component is preferably 10 mol % or more, more preferably 11 mol % or more, and particularly preferably 12 mol % or more to 100 mol % of polyhydric alcohol component in a total polyester resin. Those may be listed herein as the monomer which can be an amorphous component are preferably neopentyl glycol, 1,4-cyclohexanediol, etc.

In order to produce a heat-shrinkable polyester film particularly excellent in finish quality after shrinkage, and at the same time, to improve the finish quality after shrinkage even with having a high shrinkage, amount of neopentyl glycol and/or 1,4-cyclohexanedimethanol component is preferably 10 mol % or more, more preferably 11 mol % or more, and particularly preferably 12 mol % or more to 100 mol % of polyhydric alcohol component in the entire polyester resin, as set forth above. Although an upper limit of the component is not particularly limited, too much amount of the component sometimes deteriorates a break resistance of a film, and thus, the upper limit is preferably 40 mol % or less, more preferably 35 mol % or less, and particularly preferably 30 mol % or less.

It is preferred not to include an aliphatic straight chain diol having 8 or more carbon atoms (for example, octanediol etc.) or a trihydric or higher polyhydric alcohol (for example, trimethylolpropane, trimethylolethane, glycerin, diglycerin etc.). When a heat-shrinkable polyester film which is obtained by using a polyester containing such diol or polyhydric alcohol, it becomes hard to secure a necessary shrinkage in a main shrinkage direction.

To a resin for forming the heat-shrinkable polyester film of the present invention, according to needs, there can be added various additives, such as waxes, an antioxidant, an antistatic agent, a crystal-nucleation agent, a viscosity reducing agent, a heat stabilizer, a pigment for coloring, a color protection agent, and an ultraviolet absorber. By adding fine particles as lubricant to a resin for forming the heat-shrinkable polyester film of the present invention, it is preferable to make workability (slipperiness) of the polyethyleneterephthalate-based resin film better. The fine particles can be arbitrarily selected, for example, as inorganic fine particles, silica, alumina, titanium dioxide, calcium carbonate, kaolin, barium sulfate and the like can be listed. As organic fine particles, for example, an acrylic resin particle, a melamine resin particle, a silicone resin particle, a crosslinked polystyrene particle and the like can be listed. The average particle diameter of the fine particles is in a range of 0.05 to 3.0 μm (when measured by coulter counter), and it can be suitably selected according to need.

As a method for compounding the above-described particles in a resin for forming the heat-shrinkable polyester film, for example, they can be added in an arbitrary step in production of the polyester resin, but they are preferably added in a step of esterification, or in a step before start of polycondensation reaction after completion of ester exchange reaction as slurry dispersed in ethylene glycol etc., followed by carrying out polycondensation reaction. Further, it is also preferably carried out by a method in which slurry of particles dispersed in ethylene glycol, water or the like and raw materials of polyester resin are mixed using a kneading extruder with a vent, or a method in which dried particles and raw materials of polyester resin are mixed using a kneading extruder.

In the heat-shrinkable polyester film of the present invention, in order to raise glass transition temperature (Tg), it is preferred to mix a raw material which is easy to be compatibilized with PET and has high Tg, to obtain a Tg of film of 90° C. or higher and 140° C. or lower. The present example mixed PEN (polyethylene naphthalate, Tg=120° C.) to obtain 90° C. or higher Tg of the film. Since PET added had a Tg of 75° C., a maximum temperature of Tg in this mixture system is lower than 120° C. Percentage of PEN raw material needs to be 33% or more, and preferably 36% or more, in order to obtain a Tg of 90° C. or higher. A higher percentage of PEN is preferred, since the higher the percentage of PEN is, the higher a Tg becomes. However, since the higher the percentage of PEN is, the less the amorphous monomers are included, an upper limit of PEN percentage is 70% or less, and preferably 57% or less. It is also possible to use a polyester obtained by copolymerizing PET with 2,6-naphthalenedicarboxylic acid which is a component of PEN.

It becomes possible to obtain a heat-shrinkable polyester film of the present invention by stretching an unstretched film obtained by the method set forth above, in the width direction under predetermined conditions, and heat-treating the stretched film, as will be described later.

In a pre-heating process before the stretching, it is preferred that the film be heated to a temperature of Tg or higher to Tg +50° C. or lower. A film temperature lower than Tg in the pre-heating process is not preferred, for increasing a stretching stress in the stretching process, to cause a breakage. On the other hand, a film temperature higher than Tg +50° C. in the pre-heating process is not preferred, for lowering a stretching stress in the stretching process, to increase an uneven thickness. In the pre-heating process before a stretching, it is further preferred that a temperature of the film be heated to Tg +5° C. or higher to Tg +45° C. or lower.

In a stretching process, it is preferred that a temperature of the film be heated to Tg or higher to Tg +40° C. or lower. A film temperature lower than Tg in the stretching process is not preferred, for increasing a stretching stress, to cause a breakage. On the other hand, a film temperature higher than Tg +40° C. in the stretching process is not preferred, for lowering a stretching stress in the stretching process, to increase an uneven thickness and lower a shrinkage. In the stretching process, it is further preferred that a temperature of the film be heated to Tg +5° C. or higher to Tg +35° C. or lower.

A temperature in a heat setting process is preferably a temperature of stretching process +10° C. or higher to the temperature of stretching process +90° C. or lower. A temperature of a heat setting process lower than a temperature of stretching process +10° C. is not preferred, because an orientation relaxation of the film becomes insufficient to easily cause a lack of strength after subjected to an aging at a high temperature. On the other hand, when a temperature in a heat setting process is higher than a temperature of stretching process +90° C., a film has a lowered shrinkage when measured at 140° C., which is not preferred as a heat-shrinkable film of the present invention. In the heat setting process, it is further preferred that a heating be conducted at the temperature of stretching process +20° C. or higher to the temperature of stretching process +80° C. or lower.

A stretch ratio in the stretching process is preferably 3 times or more and 7 times or less. A stretch ratio less than 3 times is not preferred for increasing thickness unevenness. On the other hand, when a stretch ratio is more than 7 times, orientation crystallization occurs, and a shrinkage when measured at 140° C. is lowered, which is not preferred as a heat-shrinkable film of the present invention. A stretch ratio in the stretching process is further preferably 3.5 times or more and 6.5 times or less.

During the stretching mentioned above, it is also possible that a corona treatment is applied to one or both sides of the film before or after drawing to improve the adhesion of the film to a printing layer and/or an adhesive layer, etc.

In addition, during the stretching process mentioned above, it is also possible that a coating is applied to one or both sides of the film before or after drawing to improve the adhesion, mold-release property, antistatic property, lubricity, light-blocking property, and the like of the film.

In the heat-shrinkable film of the present invention, a heat-shrinkable polyolefin film is also a preferred mode. A cyclic polyolefin is preferred as a polyolefin resin to be used. It is preferred that a cyclic polyolefin resin have a norbornene or a tetracyclododecane unit as a cycloolefin unit thereof. As a copolymerization unit, it is preferred to have a non-cyclic olefin monomer unit, and particularly preferred to have an ethylene unit. Norbornene-ethylene copolymers and tetracyclododecane-ethylene copolymers are particularly preferred as cycloolefin copolymers. Among them, cyclic polyolefin resins containing ethylene units of 5 to 80 wt %, preferably 10 to 60 wt % are particularly preferred.

While a cyclic polyolefin resin usually has a glass transition temperature of −20 to 400° C., a cyclic polyolefin resin to be used in the present invention needs to have a glass transition temperature of 90 to 140° C., preferably 93 to 130° C. A glass transition temperature of lower than 90° C. is not preferred, because an amorphous orientation is relaxed with an increase of a temperature of aging, to lower shrinkage after aging. Tg higher than 140° C. is not preferred because a heat shrinkage by a heating at 140° C. is decreased.

Although a method of producing the heat-shrinkable polyolefin film of the present invention is not particularly limited, it is possible to obtain the heat-shrinkable polyolefin film of the present invention similarly as the heat-shrinkable polyester film, by forming an unstretched film by melt-extruding a raw material with an extruder, monoaxially stretching and heat treating the unstretched film by specific methods as will be shown below.

When a raw material resin is melt-extruded, an olefin resin as set forth above is extruded into a film-form by utilizing an extruder, at a temperature of 260 to 300° C. In such extrusion, it is possible to employ any existing method, such as T-die method, tubular method, etc. An olefin resin does not need a process of drying as that in the polyester resin, but can be used in an undried state.

Then, the molten resin in a form of sheet after extrusion is quenched to obtain an unstretched film. As a method of quenching the molten resin, it is possible to suitably employ a method of obtaining a substantially unoriented resin sheet by casting a molten resin from a die onto a rotary drum to quench and solidify the resin. It is also possible to accelerate the cooling by a water cooling method.

Further, the obtained unstretched film is stretched in the width direction under a predetermined condition, and subjected to a heat treatment, as will be described later, and in this manner, it is possible to obtain a heat-shrinkable polyolefin film of the present invention.

In a pre-heating process before the stretching, it is preferred that the film be heated to a temperature of Tg +10° C. or higher to Tg +50° C. or lower. A film temperature lower than Tg +10° C. in the pre-heating process is not preferred, for increasing a stretching stress in the stretching process, to cause a breakage. On the other hand, a film temperature higher than Tg +50° C. in the pre-heating process is not preferred, for lowering a stretching stress in the stretching process, to increase an uneven thickness. In the pre-heating process before the stretching, it is further preferred that the film be heated to a temperature of Tg +10° C. or higher to Tg +45° C. or lower.

In the stretching process, it is preferred that the film be heated to a temperature of Tg or higher to a temperature of pre-heating process or lower. A film temperature lower than Tg in the stretching process is not preferred, for increasing a stretching stress, to cause a breakage. On the other hand, the upper limit was set to a temperature of pre-heating process, because a polypropylene film of the present invention had an improved thickness unevenness, which was preferred, when stretched with being cooled in the stretching process. In the stretching process, it is further preferred that the film be heated to a temperature of Tg +5° C. or higher to a temperature of preheating process −5° C. or lower.

A temperature in the heat setting process is preferably a temperature of stretching process +5° C. or higher to the temperature of stretching process +40° C. or lower. A temperature of the heat setting process lower than the temperature of stretching process +5° C. is not preferred, because the film is given an insufficient orientation relaxation and tends to lack a strength after subjected to an aging at a high temperature. On the other hand, when a temperature of the heat setting process is higher than a temperature of stretching process +40° C., the film has a lowered shrinkage when measured at 140° C., which is not preferred as a heat-shrinkable film of the present invention. As for temperature in the heat setting process, it is further preferred that a heating be conducted at a temperature of stretching process +10° C. or higher to the temperature of stretching process +35° C. or lower.

A stretch ratio in the stretching process is preferably 3.5 times or more and 8 times or less. A stretch ratio of less than 3.5 times is not preferred for increasing thickness unevenness. On the other hand, when a stretch ratio is more than 8 times, orientation crystallization occurs, and a shrinkage when measured at 140° C. is lowered, which is not preferred as a heat-shrinkable film of the present invention. A stretch ratio in the stretching process is further preferably 4 times or more and 7.5 times or less.

During the stretching mentioned above, it is also possible that a corona treatment is applied to one or both sides of the film before or after drawing to improve the adhesion of the film to a printing layer and/or an adhesive layer, etc.

In addition, during the stretching process mentioned above, it is also possible that a coating is applied to one or both sides of the film before or after drawing to improve the adhesion, mold-release property, antistatic property, lubricity, light-blocking property, and the like of the film.

The package of the present invention contains a heat-shrinkable film containing the polyester, polyolefin, or the like, as a substrate, and examples of objects of the package may include various kinds of bottles and cans, plastic containers and paper boxes for confectionaries or packed lunch etc., as well as PET bottles for beverage (hereinafter, these are collectively referred to as objects to be packaged). The package of the present invention may also be used in a covering of a code or in a reinforcement of a wire-connecting portion of a motor, or the like. Incidentally, when a label containing the heat-shrinkable film as a substrate is heat-shrunk to cover those objects to be packaged, the label is commonly heat-shrunk by about 2 to 15% so as to be closely adhered to an object to be packaged. Incidentally, a label to cover an object to be packaged may have a print or may not have a print thereon.

As a method of producing a label, an organic solvent is applied on one of the faces of a rectangular film, slightly inner from the edge, and immediately thereafter, the film is rolled with the end portions overlapped and adhered to each other to form a label; or alternatively, an organic solvent is applied on one of the faces, slightly inner from the edge, of a film which has been wound in roll-form, and immediately thereafter, the film is rolled with the end portions overlapped and adhered to each other to form a tubular body, which is then cut into a label form. As the organic solvent for the adhesion, cyclic ethers such as 1,3-dioxolane, tetrahydrofuran, or the like is preferred. In addition to this, it is also possible to use aromatic hydrocarbons such as benzene, toluene, xylene, trimethylbenzene, etc., halogenated hydrocarbons such as methylene chloride, chloroform, etc., phenols such as a phenol, etc., or mixtures thereof. An adhesion by heat sealing is also available. It is also possible to obtain a tubular form by using an adhesive.

EXAMPLES

Next, the present invention will be described more concretely by way of Examples. However, the present invention is by no means limited by modes of the Examples within a range not deviated from the gist of the present invention The evaluation method of the film of the present invention is as follows.

[Heat Shrinkage (Glycerin Heat Shrinkage)]

A film was cut into a square of 10 cm×10 cm, treated and heat-shrunk in no load state for 10 seconds in glycerin heated to a predetermined temperature±0.5° C., and then the dimensions of the film in the lengthwise and transverse directions were measured, and heat shrinkage each was obtained according to the following Equation 1.

$$\text{Heat shrinkage} = \{(\text{Length before shrinkage} - \text{Length after shrinkage})/\text{Length before shrinkage}\} \times 100 \ (\%) \quad \text{(Equation 1)}$$

[Method for Measuring Difference in Heat Shrinkage Before and after Aging]

Using the above Equation 1, the heat shrinkage of a film in the film main shrinkage direction before and after aging in glycerin at 140° C. was measured. It was calculated using the following Equation 2. Incidentally, aging of the film was carried out for 672 hours in a gear oven with a temperature set to 50° C., and a relative humidity set to 70%.

$$\text{Difference in heat shrinkage before and after aging} = \text{Heat shrinkage before aging} - \text{Heat shrinkage after aging} \quad \text{(Equation 2)}$$

[Method for Measurement of Natural Shrinkage]

A film is sampled in a length of 20 mm in the film direction orthogonal to the main shrinkage direction and 240 mm in the film main shrinkage direction, and marked with lines such that the length in the film main shrinkage direction is 200 mm. The length between the lines is designated as a length (mm) before aging. The film is aged for 672 hours in a geer oven set at a temperature of 60° C. and a relative humidity of 40%, followed by determining the natural shrinkage from the following Equation 2 with the length between the lines designated as a length (mm) after aging.

$$\text{Natural shrinkage} = \{(\text{Length before aging} - \text{Length after aging})/\text{Length before aging}\} \times 100\% \quad \text{(Equation 3)}$$

[Tg (Glass Transition Point)]

Using a differential scanning calorimeter manufactured by Seiko Instruments Inc. (model: DSC220), 5 mg of an unstretched film was heated at a heating-up speed of 10° C./min from −40° C. to 120° C., Tg (glass transition point) was obtained from the thus obtained endothermic curve. Tangent lines were stretched in front of and behind the inflection point of the endothermic curve, and the intersection was defined as Tg.

[Method of Measuring Tensile Strength at Break and Tensile Elongation at Break]

A tensile test was carried out in conformity with JIS-K7113, making a rectangular specimen with a predetermined size, holding both ends of the specimen with a universal tensile tester, under a condition of 200 mm/min. tensile speed. Then an elongation at a tensile break of the film was calculated as a tensile elongation at break, and strength at a break of the film was calculated as a tensile strength at break. Incidentally, when a value after an aging was measured, aging of the film was carried out for 672 hours in a gear oven with a temperature set to 50° C., and a relative humidity set to 70%.

[Ratio of Tensile Elongation at Break]

Based on a value in the main shrinkage direction and a value in the direction orthogonal to the main shrinkage direction obtained by the above described method, ratio of tensile elongation at break was obtained by the following Equation 4.

Ratio of tensile elongation at break=Value in main shrinkage direction÷Value in direction orthogonal to main shrinkage direction (Equation 4)

[Tear Propagation Strength]

The measuring was conducted by Elmendorf method in conformity with JIS-K7128. Incidentally, when a value after an aging is measured, aging of the film was carried out for 672 hours in a gear oven with a temperature set to 50° C., and a relative humidity set to 70%.

[Ratio of Tear Propagation Strength]

Based on a value in the main shrinkage direction and a value in the direction orthogonal to the main shrinkage direction obtained by the above described method, ratio of tear propagation strength was obtained by the following Equation 5.

Ratio of tear propagation strength=Value in main shrinkage direction÷Value in direction orthogonal to main shrinkage direction (Equation 5)

[Finish Quality after Shrinkage]

The heat-shrinkable film was subjected to two-color printing in advance, with grass/gold colors of Toyo Ink Manufacturing Co., Ltd. Both end portions of the printed film were heat-sealed taking 1 second with a heat seal bar of 210° C. to produce a cylindrical label (a label in which a main shrinkage direction of a heat-shrinkable film is the circumferential direction). Thereafter, a test was conducted by using a hot air tunnel manufactured by Fuji Astec Inc., with a passing time of 10 seconds and a zone temperature of 140° C., using a metal can made of steel with a diameter of 8 cm and a height of 10 cm (measured number=20).

At the time of being mounted, the label has a flat width of 14 cm and shrinkage of about 10%.

Evaluation was carried out by visual observation, with criteria as follows.

good: None of wrinkle, jumping up, and insufficient shrinkage occurred poor: Wrinkle, jumping up, or insufficient shrinkage occurred

[Shrink Distortion in Label]

As an evaluation of finish quality after shrinkage, a maximum value of distortion was obtained by measuring distortions in 360° directions in an upper part of a mounted label, by using a gauge. At the time, criteria were set as follows.

good: Maximum distortion of less than 1.5 mm poor: Maximum distortion of 1.5 mm or more

[Label Strength after Aging Storage]

After the label was mounted on a can, a storage was performed in a thermo-hygrostat of a temperature of 70° C. and a relative humidity of 70% for 504 hours. After the storage, the label was removed from the can and measured for a tensile elongation at break in a main shrinkage direction and in a non-shrinkage direction in the same manner as described above.

Evaluation was carried out by visual observation, with criteria as follows.

good: Elongation at break of 10% or more both in main shrinkage direction and in direction orthogonal to main shrinkage direction poor: Elongation at break of less than 10% in main shrinkage direction and/or in direction orthogonal to main shrinkage direction

[Content of Amorphous Component]

About 5 mg of sampled films were dissolved in a mixed solution of deuterated chloroform and trifluoroacetic acid (volume ratio 9/1) 0.7 ml and a 1H-NMR (UNITY50, manufactured by varian) was used in determination. Content of individual amorphous component (mole) of outer layers was obtained, and a difference therebetween was deemed as a difference in a content of amorphous component (mole). Incidentally, in all of the present examples, as the content of the amorphous component, neopentyl glycol content was obtained.

Table 1 and Table 2 respectively shows properties and compositions of the polyester raw materials used in the Examples and the Comparative Examples, and conditions for producing the films of the Examples and the Comparative Examples (conditions for stretch, heat treatment, etc.).

TABLE 1

|  | Dicarboxylic acid component (mol %) | Polyhydric alcohol component (mol %) | | Addition amount of lubricant | Tg |
| --- | --- | --- | --- | --- | --- |
|  | DMT | EG | NPG | (ppm) | (° C.) |
| Raw material a | 100 | 100 | — | 8000 | 75 |
| Raw material b | 100 | 100 | — | — | 75 |
| Raw material c | 100 | 70 | 30 | — | 75 |

|  | Product name | Tg (° C.) |
| --- | --- | --- |
| Raw material d | PEN | 120 |
| Raw material e | TOPAS (Registered trademark) 5013 | 140 |
| Raw material f | TOPAS (Registered trademark) | 80 |

TABLE 1-continued

8007

|  | Dicarboxylic acid component (mol %) | | | Polyhydric alcohol component (mol %) | | Addition amount of lubricant (ppm) | Tg (° C.) |
|---|---|---|---|---|---|---|---|
|  | DMT | IPA | NDA | EG | bisA-EO | | |
| Raw material g | 90 | 10 | — | 100 | — | — | 72 |
| Raw material h | — | — | 100 | 90 | 10 | — | 121 |

Abbreviations in the table are as follows.
DMT: Dimethyl terephthalate,
EG: Ethylene glycol,
NPG: Neopentyl glycol,
PEN : Polyethylene naphthalate,
IPA: Isophthalic acid,
NDA: Naphthalene dicarboxylic acid,
bisA-EO: Ethylene oxide adduct of bisphenol A

TABLE 2

|  | Resin composition | Amorphous component of PET mol % | Tg (° C.) | Transverse stretch process | | | |
|---|---|---|---|---|---|---|---|
|  |  |  |  | Pre-heating temperature (° C.) | Stretch temperature (° C.) | Stretch ratio | Heat setting temperature (° C.) |
| Example 1 | a/b/c/d = 5/5/50/40 | 15 | 93 | 120 | 100 | 4 | 125 |
| Example 2 | a/c/d = 5/45/50 | 13.5 | 98 | 120 | 100 | 4 | 125 |
| Example 3 | e/f = 80/20 | — | 128 | 140 | 133 | 4 | 150 |
| Example 4 | e/f = 50/50 | — | 110 | 140 | 133 | 4 | 150 |
| Comparative Example 1 | a/b/c/d = 5/25/50/20 | 15 | 84 | 120 | 100 | 4 | 125 |
| Comparative Example 2 | a/b/c = 5/45/50 | 21 | 75 | 100 | 80 | 4 | 140 |
| Comparative Example 3 | f = 100 | — | 80 | 100 | 80 | 4 | 140 |
| Comparative Example 4 | g/h = 60/40 | 6 | 92 | 120 | 120 | 4.5 | 120 |

The polyesters used in the Examples are as follows.
Raw materials a, b: Polyethylene terephthalate, Intrinsic viscosity of 0.75 dl/g
Raw material c: Polyester consisting of 30 mol % neopentyl glycol, 70 mol % ethylene glycol, and terephthalic acid, Intrinsic viscosity 0.78 dl/g,
Raw material d: PEN, Tg 120° C., Intrinsic viscosity 0.6 dl/g
Raw material e: Cyclic polyolefin resin (manufactured by Polyplastics Co., LTD., Product name: Topas (Registered Trademark 5013)), Tg 140° C.
Raw material f: Cyclic polyolefin resin (manufactured by Polyplastics Co., LTD., Product name: Topas (Registered Trademark 8007)) Tg 80° C.
Raw material g: Polyester consisting of 90 mol % terephthalic acid, 10 mol % isophthalic acid, and 100 mol % ethylene glycol, Intrinsic viscosity 0.78 dl/g
Raw material h: Polyester consisting of 100 mol % naphthalene dicarboxylic acid, 90 mol % ethylene glycol, and 10 mol % an ethylene oxide adduct of bisphenol A, Intrinsic viscosity 0.75 dl/g Example 1

The above described raw material a, raw material b, raw material c, and raw material d were mixed at a weight ratio of 5:5:50:40, and the mixture was fed to an extruder. Thereafter, the mixture resin was melted at 280° C. and extruded from a T-die, and quenched by being wound around a rotating metal roll having a surface cooled to 30° C., to obtain an unstretched film with a thickness of 180 μm. Speed of taking off the unstretched film (rotational speed of the metal roll) at this time was about 20 m/min. Tg of the unstretched film was 93° C.

The unstretched film obtained as above was pre-heated at 120° C. and a wind velocity of 12 m/sec., for 8 seconds, with the both end sides in the width direction held with clips, and thereafter, stretched by 4.0 times in the width direction (transverse direction) at 100° C. and a wind velocity of 18 m/sec. Thereafter, the transverse stretched film was led to a final heat treatment zone in a tenter, with the both end sides in the width direction held with clips, and heat-treated in the heat treatment zone at 125° C. and a wind velocity of 10 m/sec., for 8 seconds, and then cooled. Then, after having the both edge portions cut off, the film was wound up into a roll form, to thus produce a monoaxially stretched film of about 45 μm, having a width of 500 mm, continuously. Then, properties of the obtained film were evaluated by the method described above. Results of the evaluation are shown in Table 3.

The obtained film had the target properties, with desirable results of excellence in physical change after aging, and in finish quality after shrinkage.

Example 2

The raw material mixing ratio of raw material a, raw material c, and raw material d was changed to 5:45:50 in weight ratio, and Tg of the obtained unstretched film was 98° C. By the same method as in Example 1, except for the above, a monoaxially stretched film was produced continuously. Then, properties of the obtained film were evaluated by the method described above. Results of the evaluation are shown in Table 3. The obtained film exhibited desirable results similarly as Example 1.

Example 3

The above described raw material e and raw material f were mixed at a weight ratio of 80:20, and the mixture was fed to an extruder. Thereafter, the mixture resin was melted at 280° C. and extruded from a T-die, and quenched by being wound around a rotating metal roll having a surface cooled to 30° C., to obtain an unstretched film with a thickness of 180 μm. Speed of taking up the unstretched film (rotational speed of the metal roll) at this time was about 20 m/min. Tg of the obtained unstretched film was 128° C.

The unstretched film obtained as above was pre-heated at 140° C. and a wind velocity of 12 m/sec., for 8 seconds, with the both end sides in the width direction held with clips, and thereafter, stretched by 4.0 times in the width direction (transverse direction) at 133° C. and a wind velocity of 18 m/sec. Thereafter, the transverse stretched film was led to the final heat treatment zone in the tenter, with the both end sides in the width direction held with clips, and heat-treated in the heat treatment zone, at 150° C. and a wind velocity of 10 m/sec., for 8 seconds, and then cooled. Then, after having the both edge portions cut off, the film was wound up into a roll form, to thus produce a monoaxially stretched film of about 45 μm, having a width of 500 mm, continuously. Then, properties of the obtained film were evaluated by the method described above. Results of the evaluation are shown in Table 3.

The obtained film had the target properties, with desirable results of excellence in physical change after aging and in finish quality after shrinkage.

Example 4

The raw material mixing ratio of raw material e and raw material f was changed to 50:50 in weight ratio, and Tg of the obtained unstretched film was 110° C. By the same method as in Example 1, except for the above, a monoaxially stretched film was produced, continuously. Then, properties of the obtained film were evaluated by the method described above. Results of the evaluation are shown in Table 3. The obtained film exhibited desirable results similarly as Example 3.

Comparative Example 1

The raw material mixing ratio of raw material a, raw material b, raw material c, and raw material d was changed to 5:25:50:20 in weight ratio, and Tg of the obtained unstretched film was 84° C. By the same method as in Example 1, except for the above, a monoaxially stretched film was produced, continuously. Then, properties of the obtained film were evaluated by the method described above. Results of the evaluation are shown in Table 3. The obtained film was a film inferior to the Examples in tensile elongation at break after aging.

Comparative Example 2

A mixture resin, obtained by changing the raw material mixing ratio of raw material a, raw material b, and raw material c to 5:45:50 in weight ratio, was melted at 280° C. and extruded from a T-die, and quenched by being wound around a rotating metal roll having a surface cooled to 30° C., to obtain an unstretched film with a thickness of 180 μm. Speed of taking up the unstretched film (rotational speed of the metal roll) at this time was about 20 m/min. Tg of the obtained unstretched film was 75° C.

The unstretched film obtained as above was pre-heated at 100° C. and a wind velocity of 12 m/sec., for 8 seconds, with the both end sides in the width direction held with clips, and then stretched by 4.0 times in the width direction (transverse direction) at 80° C. and a wind velocity of 18 m/sec. Thereafter, the transverse stretched film was led to the final heat treatment zone in the tenter, with the both end sides in the width direction held with clips, and heat-treated in the heat treatment zone, at 140° C. and a wind velocity of 10 m/sec., for 8 seconds, and then cooled. Then, after having the both edge portions cut off, the film was wound up into a roll form, to thus produce a monoaxially stretched film of about 45 μm, having a width of 500 mm, continuously. Then, properties of the obtained film were evaluated by the method described above. Results of the evaluation are shown in Table 3.

The film was inferior to the Examples in tensile elongation at break after aging.

Comparative Example 3

The weight ratio of raw material f was changed to 100, and Tg of unstretched film was 80° C. By the same method as in Comparative Example 2, except for the above, a monoaxially stretched film was produced, continuously. Then, properties of the obtained film were evaluated by the method described above. The film was inferior to the Examples in tensile elongation at break after aging.

Comparative Example 4

The above described raw material g and raw material h were mixed at a weight ratio of 60:40, and the mixture was fed to an extruder. Thereafter, the mixture resin was melted at 290° C. and extruded from a T-die, and quenched by being wound around a rotating metal roll having a surface cooled to 30° C., to obtain an unstretched film with a thickness of 202 μm. Speed of taking up the unstretched film (rotational speed of the metal roll) at this time was about 20 m/min. Tg of the obtained unstretched film was 91° C. The obtained unstretched film was pre-heated at 120° C. and a wind velocity of 12 m/sec., for 8 seconds, with the both end sides in the width direction held with clips, and thereafter, stretched by 4.5 times in the width direction (transverse direction) at 120° C. and a wind velocity of 12 m/sec. Thereafter, the transverse stretched film was led to the final heat treatment zone in the tenter, with the both end sides in the width direction held with clips, and heat-treated in the heat treatment zone, at 120° C. and a wind velocity of 12 m/sec., for 8 seconds, and then cooled. Then, after having the both edge portions cut off, the film was wound up into a roll form, to thus produce a monoaxially stretched film of about 45 μm, having a width of 500 mm, continuously. Then, properties of the obtained film were evaluated by the method described above. Results of the evaluation are shown in Table 3.

The film had an insufficient shrink, and an inferior finish quality after shrinkage. The film also had a significantly decreased shrinkage after aging. Consequently, the film was inferior to the Examples.

TABLE 3

| | before aging | | | | | | | | | |
|---|---|---|---|---|---|---|---|---|---|---|
| | | Glycerin Heat Shrinkage (%) | | | Tensile Elongation at Break (%) | | Ratio | | | Label |
| | Thickness (μm) | Main shrinkage direction at 80° C. | Non-shrinkage direction at 140° C. | Main shrinkage direction at 140° C. | Main shrinkage direction | Non-shrinkage direction | Ratio of Elongation at Break | of Tear propagation strength | Finish Quality | Shrink Distortion in Label | Strength before Aging Storage |
| Example 1 | 45 | 3 | 2 | 45 | 70 | 550 | 0.12 | 0.15 | good | good | good |
| Example 2 | 45 | 2 | 2 | 41 | 61 | 495 | 0.12 | 0.15 | good | good | good |
| Example 3 | 45 | 0 | 6 | 71 | 85 | 450 | 0.19 | 0.2 | good | good | good |
| Example 4 | 45 | 0 | 4 | 60 | 80 | 400 | 0.2 | 0.22 | good | good | good |
| Comparative Example 1 | 45 | 2 | 1 | 33 | 60 | 88 | 0.68 | 0.7 | good | good | good |
| Comparative Example 2 | 45 | 0 | 2 | 55 | 40 | 70 | 0.57 | 0.6 | good | good | good |
| Comparative Example 3 | 45 | 0 | 2 | 51 | 60 | 90 | 0.67 | 0.7 | good | good | good |
| Comparative Example 4 | 45 | 0 | 2 | 27 | 80 | 590 | 0.14 | 0.18 | poor | poor | good |

| | after aging | | | | | | | |
|---|---|---|---|---|---|---|---|---|
| | Natural | Glycerin Heat Shrinkage | Difference of heat shrinkage | Tensile Elongation at Break (%) | | | Shrink | Label Strength |
| | Shrinkage (%) | at 140° C. (%) | at 140° C. (%) | Main shrinkage direction | Non-shrinkage direction | Finish Quality | Distortion in Label | after Aging Storage |
| Example 1 | 0.05 | 45 | 0 | 55 | 30 | good | good | good |
| Example 2 | 0.05 | 41 | 0 | 51 | 25 | good | good | good |
| Example 3 | 0.2 | 70 | 1 | 70 | 41 | good | good | good |
| Example 4 | 0.2 | 59 | 1 | 66 | 35 | good | good | good |
| Comparative Example 1 | 0.05 | 25 | 8 | 50 | 5 | poor | poor | poor |
| Comparative Example 2 | 0.1 | 42 | 13 | 36 | 3 | good | poor | poor |
| Comparative Example 3 | 0.2 | 40 | 11 | 50 | 5 | good | poor | poor |
| Comparative Example 4 | 0.3 | 19 | 8 | 60 | 20 | poor | poor | good |

INDUSTRIAL APPLICABILITY

The heat-shrinkable film of the present invention has excellent physical properties after aging as set forth above, and therefore, can desirably be used in label application, or in a use in a location in a high temperature.

The invention claimed is:

1. A heat-shrinkable film which satisfies requirements (1) to (8) below:

(1) the heat-shrinkable film has a glass transition temperature (Tg) of 90° C. or higher and 140° C. or lower;

(2) the heat-shrinkable film has a shrinkage of 12% or less in a main shrinkage direction of the heat-shrinkable film when treated in glycerin at 80° C. for 10 seconds;

(3) the heat-shrinkable film has a shrinkage of 12% or less in a direction orthogonal to the main shrinkage direction of the heat-shrinkable film when treated in glycerin at 140° C. for 10 seconds;

(4) the heat-shrinkable film has a shrinkage of 30% or more and 80% or less in the main shrinkage direction of the heat-shrinkable film when treated in glycerin at 140° C. for 10 seconds;

(5) the heat-shrinkable film has a tensile elongation at break of 10% or more both in the main shrinkage direction and in the direction orthogonal to the main shrinkage direction of the heat-shrinkable film after an aging of 672 hours under an atmosphere of a temperature of 50° C. and a relative humidity of 70%;

(6) the heat-shrinkable film has a difference of 5% or less between a shrinkage at 140° C. in the main shrinkage direction of the heat-shrinkable film after the aging of 672 hours under an atmosphere of a temperature of 50° C. and a relative humidity of 70%, and a shrinkage at 140° C. in the main shrinkage direction of the heat-shrinkable film before the aging;

(7) the heat-shrinkable film is a polyester film or a cyclic polyolefin film, wherein the polyester film contains a dicarboxylic acid component, a diol component, and a second alcohol component different from the diol component, wherein the dicarboxylic acid component constituting the polyester film is terephthalic acid and/or 2,6-naphthalenedicarboxylic acid, the diol component constituting the polyester film is a ethylene glycol component, wherein the second alcohol component is at least one selected from the group consisting of 1,3-propanediol, 1,4-butanediol, neopentyl glycol, 2,2-diethyl-1,3-propanediol, 1,6-hexanediol, 3-methyl-1,5-pentanediol, 2-methyl-1,5-pentanediol, 1,9-nonanediol, 1,10-decane diol, 1,4-cyclohexane dimethanol, and diethylene glycol, and wherein the cyclic polyolefin film contains a norbornene or a tetracyclododecane unit as a cycloolefin unit and a non-cyclic olefin monomer unit as a copolymerization unit and (8) the polyester film contains 33 mass % or more and 57 mass % or less of a component derived from polyethylene naphthalate in the 100 mass % of polyester film.

2. The heat-shrinkable film according to claim 1, wherein a ratio of a tensile strength at break in the main shrinkage direction of the heat-shrinkable film and in the direction orthogonal to the main shrinkage direction (a tensile strength at break in the main shrinkage direction of the film÷a tensile strength at break in the direction orthogonal to the main shrinkage direction of the film) is 0.1 or more and 0.5 or less.

3. The heat-shrinkable film according to claim 2, wherein a ratio of a tear propagation strength in the main shrinkage direction of the heat-shrinkable film and in the direction orthogonal to the main shrinkage direction (a tear propagation strength in the main shrinkage direction of the film÷a tear propagation strength in the direction orthogonal to the main shrinkage direction of the film) is 0.1 or more and 0.5 or less.

4. The heat-shrinkable film according to claim 3, which has a shrinkage of 1.5% or less in the main shrinkage direction of the heat-shrinkable film after the aging of 672 hours under an atmosphere of a temperature of 50° C. and a relative humidity of 70%.

5. The heat-shrinkable film according to claim 4, which is a monoaxially stretched film.

6. A heat-shrinkable label including the heat-shrinkable film according to claim 5.

7. A package formed by covering at least a part of an outer periphery of an object to be packaged with the heat-shrinkable label according to claim 6.

8. The heat-shrinkable film according to claim 1, wherein a ratio of a tear propagation strength in the main shrinkage direction of the heat-shrinkable film and in the direction orthogonal to the main shrinkage direction (a tear propagation strength in the main shrinkage direction of the film÷a tear propagation strength in the direction orthogonal to the main shrinkage direction of the film) is 0.1 or more and 0.5 or less.

9. A heat-shrinkable label including the heat-shrinkable film according to claim 8.

10. A package formed by covering at least a part of an outer periphery of an object to be packaged with the heat-shrinkable label according to claim 9.

11. The heat-shrinkable film according to claim 1, which has a shrinkage of 1.5% or less in the main shrinkage direction of the heat-shrinkable film after the aging of 672 hours under an atmosphere of a temperature of 50° C. and a relative humidity of 70%.

12. A heat-shrinkable label including the heat-shrinkable film according to claim 11.

13. A package formed by covering at least a part of an outer periphery of an object to be packaged with the heat-shrinkable label according to claim 12.

14. The heat-shrinkable film according to claim 1, which is a monoaxially stretched film.

15. A heat-shrinkable label including the heat-shrinkable film according to claim 14.

16. A package formed by covering at least a part of an outer periphery of an object to be packaged with the heat-shrinkable label according to claim 15.

17. A heat-shrinkable label including the heat-shrinkable film according to claim 1.

18. A package formed by covering at least a part of an outer periphery of an object to be packaged with the heat-shrinkable label according to claim 17.

19. The heat-shrinkable film according to claim 1, wherein the content of the second alcohol component is 10 mol % or more and 40 mol % or less to 100 mol % of polyhydric alcohol component in a total polyester resin.

* * * * *